United States Patent
Wursche et al.

(10) Patent No.: US 10,829,590 B2
(45) Date of Patent: Nov. 10, 2020

(54) PROCESS FOR PREPARING POLYALKENAMERS FOR PACKAGING APPLICATIONS

(71) Applicant: Evonik Operations GmbH, Essen (DE)

(72) Inventors: Roland Wursche, Duelmen (DE); Jürgen Herwig, Huenxe (DE); Peter Kreis, Dortmund (DE); Marina Lazar, Hasselroth (DE); Martin Roos, Haltern am See (DE); Goetz Baumgarten, Haltern am See (DE); Christian Schnitzer, Duelmen (DE)

(73) Assignee: Evonik Operations GmbH, Essen (DE)

( * ) Notice: Subject to any disclaimer, the term of this patent is extended or adjusted under 35 U.S.C. 154(b) by 323 days.

(21) Appl. No.: 15/763,638

(22) PCT Filed: Oct. 6, 2016

(86) PCT No.: PCT/EP2016/073898
§ 371 (c)(1),
(2) Date: Mar. 27, 2018

(87) PCT Pub. No.: WO2017/060363
PCT Pub. Date: Apr. 13, 2017

(65) Prior Publication Data
US 2018/0273679 A1   Sep. 27, 2018

(30) Foreign Application Priority Data
Oct. 7, 2015 (EP) .................................... 15188716

(51) Int. Cl.
*C08G 61/08* (2006.01)
*C08G 61/12* (2006.01)
(Continued)

(52) U.S. Cl.
CPC ........... *C08G 61/08* (2013.01); *B01D 61/027* (2013.01); *B01D 61/145* (2013.01);
(Continued)

(58) Field of Classification Search
CPC ........ C08G 61/08; C08G 61/06; C08G 61/00; B01D 61/14; B01D 61/145; B01D 61/147; B01D 61/027
See application file for complete search history.

(56) References Cited

U.S. PATENT DOCUMENTS 6,159,370 A    12/2000 Hicke et al.
6,946,533 B2*  9/2005  Grubbs et al. ............ C08F 4/00
                                                        526/171
(Continued)

FOREIGN PATENT DOCUMENTS

EP   0 943 645 A2   9/1999
EP   2 017 308 A1   1/2009
(Continued)

OTHER PUBLICATIONS

U.S. Appl. No. 15/743,205, filed Jan. 9, 2018, Roland Wursche.
(Continued)

*Primary Examiner* — Rip A Lee
(74) *Attorney, Agent, or Firm* — Grüneberg and Myers PLLC

(57) ABSTRACT

A process has the ability to produce polyalkenamer-containing compositions. Stages of the process include converting at least one cycloalkene by ring-opening metathetic polymerization to obtain a polyalkenamer-containing product mixture, and working up the product mixture to remove at least one of a monomer and an oligomer of the at least one cycloalkene to obtain the polyalkenamer-containing composition. The working up stage is effected by a diafiltration.

10 Claims, 1 Drawing Sheet

(51) Int. Cl.
*B01D 61/14* (2006.01)
*B01D 61/02* (2006.01)
*B01D 71/02* (2006.01)

(52) U.S. Cl.
CPC .......... *B01D 71/024* (2013.01); *C08G 61/12* (2013.01); *B01D 2315/16* (2013.01); *C08G 2261/11* (2013.01); *C08G 2261/228* (2013.01); *C08G 2261/3322* (2013.01); *C08G 2261/418* (2013.01); *C08G 2261/71* (2013.01)

(56) References Cited

U.S. PATENT DOCUMENTS

| | | | |
|---|---|---|---|
| 7,687,635 B2* | 3/2010 | Verpoort | C07F 15/0046 548/103 |
| 10,570,249 B2* | 2/2020 | Wursche | C08G 61/08 |
| 10,689,483 B2* | 6/2020 | Wursche | C08G 61/08 |
| 2003/0113740 A1 | 6/2003 | Mirkin et al. | |
| 2008/0103346 A1* | 5/2008 | Burdett et al. | C07C 7/144 585/818 |
| 2008/0200695 A1* | 8/2008 | Holz et al. | C07F 9/28 548/404 |
| 2009/0169902 A1* | 7/2009 | Inubushi et al. | B32B 27/32 |
| 2012/0123079 A1 | 5/2012 | Ungerank et al. | |
| 2012/0279922 A1 | 11/2012 | Haensel et al. | |
| 2013/0172635 A1 | 7/2013 | Hannen et al. | |
| 2017/0313818 A1* | 11/2017 | Shaepertoens et al. | C08G 65/30 |
| 2017/0360947 A1* | 12/2017 | Durrieu | A61K 47/60 |

FOREIGN PATENT DOCUMENTS

| | | |
|---|---|---|
| EP | 2 799 465 A1 | 11/2014 |
| WO | 1994/007379 A1 | 4/1994 |
| WO | 1994/007944 A1 | 4/1994 |
| WO | 1998/006779 A1 | 2/1998 |
| WO | 2003/062253 A1 | 7/2003 |
| WO | 2010/142979 A1 | 12/2010 |

OTHER PUBLICATIONS

U.S. Appl. No. 15/751,601, filed Feb. 9, 2018, Roland Wursche.
Basile et al., "Membranes for industrial microfiltration and ultrafiltration," in "Advanced membrane science and technology for sustainable energy and environmental applications," edited by Basile and Nunes, Woodhead Publishing Series in Energy, No. 25, pp. 647-679, Woodhead Publishing Limited, 2011.
Bielawski et al., "Highly Efficient Ring-Opening Metathesis Polymerization (ROMP) Using New Ruthenium Catalysts Containing N-Heterocyclic Carbene Ligands**," Angew. Chem. Int. Ed. 2000, vol. 39, No. 16, pp. 2903-2906.
Dräxler, "Polyalkenylenes" in "Handbook of Elastomers," 2nd Ed., Edited by Bhowmick and Stephens, 2001, pp. 697-722.
Keitz, Diastereocontrol in Olefin Metathesis: the Development of Z-Selective Ruthenium Catalysts, in "Handbook of Metathesis" edited by Grubbs et al., Wiley-VCH Verlag GmbH & Co. KGaA, 2015, pp. 71-85.
Irvin et al., "Monocyclic Alkenes and Polyenes," in "Olefin Metathesis and Metathesis Polymerization," Academic Press 1997; Handbook of Metathesis, vol. 1-3, R. H. Grubbs, Wiley-VCH 2003, pp. 260-287.
Umweltbundesamt, Innenraumlufthygiene-Kommission des Umweltbundesamtes, Leitfaden für die lnnenraumhygiene in Schulgebäuden [German Environment Agency, Indoor Air Hygiene Commission of the German Environment Agency, Guidelines for Indoor Air Hygiene in School Buildings], p. 47, 2008.
Melin et al., Membranverfahren: Grundlagen der Modul- und Anlagenauslegung [Membrane Processes: Principles of Module and System Design], 3rd ed., Springer 2007, pp. 207-211, 285-308 & 309-368.
Mulder, "Basic Principals of Membrane Technology," Chp. 8, Module and Process Design, Kluwer Academic Publishers, 1996, pp. 465-520.
Mallada et al., "Inorganic Membranes: Synthesis, Characterization, and Applications," vol. 13, Elsevier, 2008, pp. 177-216.
Nguyen et al., "Ring-Opening Metathesis Polymerization (ROMP) of Norbornene by a Group VIII Carbene Complex in Protic Media," J. Am. Chem. Soc., 1992, vol. 114, pp. 3974-3975.
Papier et al., Verarbeiter, Die Fachzeitschrift für Druck, 10, 1990, pp. 4, 36-40.
M. Schlegelmilch, Geruchsmanagement: Methoden zur Bewertung and Verminderung von Ge-ruchsemissionen [Odour Management: Methods of Assessing and Reducing Odour Emissions], Hamburger Berichte 32 from the Hamburg-Harburg University of Technology, Abfall aktuell Pub-lishers 2009, ISBN 978-3-9810064-9-0.
Weskamp et al., "Highly Active Ruthenium Catalysts for Olefin Metathesis: The Synergy of N-Heterocyclic Carbenes and Coordinatively Labile Ligands**," Angew. Chem. Int. Ed. 1999, 38, pp. 2416-2419.
Weskamp et al., "N-heterocyclic carbenes: novel ruthenium-alkylidene complexes," J. Organomet. Chem. 1999, 582, pp. 362-365.

* cited by examiner

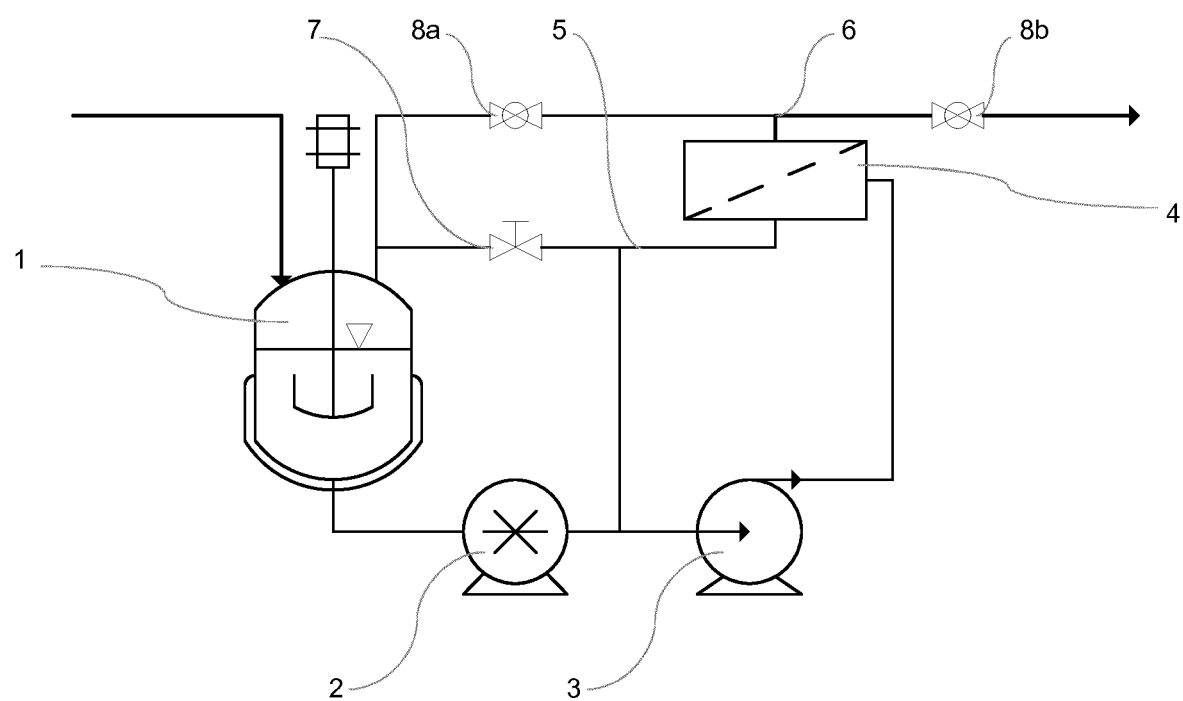

PROCESS FOR PREPARING POLYALKENAMERS FOR PACKAGING APPLICATIONS

This application is a National Stage entry under § 371 of International Application No. PCT/EP2016/073898, filed on Oct. 6, 2016, and which claims the benefit of European Patent Application No. 15188716.3, filed on Oct. 7, 2015.

The present invention relates to a process for producing polyalkenamer-containing compositions. The invention further relates to the use of polyalkenamer-containing compositions in the field of packaging materials, especially for food and drink.

To increase the lifetime of packaged foods, it is possible to employ the principle of the active oxygen barrier. This means that, as well as the customary passive barrier layers, for example nylon-6, poly-ethylene terephthalate or ethylene-vinyl alcohol copolymer, additional "active" components which bind oxygen by chemical reaction (oxidation) are used in the packaging. This may firstly relate to oxygen present within a packaging (residual oxygen in modified atmosphere packaging (MAP) packaging) and secondly to oxygen which diffuses into the packaging through the passive barrier over the course of time. This "active" component may be present in different regions of the packaging; for example, it may be part of a separate layer of a multilayer packaging system or else introduced directly into the abovementioned passive barrier layer. The chemical reaction with the additional "active" component reduces any chemical reaction of the oxygen with, for example, ingredients of the packaged foods (fats, vitamins, etc.) or else aerobic bacterial and fungal growth, such that the quality of the foods is conserved for longer. This in turn give rise to advantages, since less food is spoiled prior to sale or prior to consumption and so resources are conserved in various aspects. Furthermore, a lower level of preservatives, if any, needs to be added to foods. Typically, the active component contains a readily oxidizable organic compound, and additionally further constituents such as metal salts as catalysts or else photoinitiators. Oxidizable compounds proposed for this purpose are, for example, polyoctenamers; see, for example, EP2017308A1, WO9407944A1, WO9407379A1 and WO9806779A1.

The preparation of polyoctenamer is known from the literature (see, for example, US2013/172635), and it follows the principle of what is called metathesis polymerization. It is also known that polyoctenamer, like other metathesis polymers too, starting with the monomer, contains a proportion of low molecular weight cyclic compounds (oligomers) (see A. Dräxler in Handbook of Elastomers, 2nd edition, 697-722, 2001). These molecules are relatively mobile up to a particular molecular weight, i.e. are converted to the gas phase and lead to a disadvantageous odour of packaging materials because of their odour activity. Moreover, they are fat-soluble because of their polarity, and so it is conceivable that they will pass over into the packaged material. Because of these properties, the polymers prepared by metathesis have limited possible use in packaging applications, meaning that important fields of application even remain closed, specifically for the purpose of utilization of polyoctenamers as a constituent of a packaging containing an "active oxygen barrier". Extraction of low molecular weight cyclic compounds from polyoctenamers with acetone or isopropanol has been described in the literature; see A. Dräxler in Handbook of Elastomers, 2nd edition, 697-722, 2001. EP2017308A1 also describes corresponding extractions with various solvents.

The ring-opening metathesis polymerization (ROMP) of cycloalkenes is known per se (Olefin Metathesis and Metathesis Polymerization, K. J. Irvin, J. C. Mol, Academic Press 1997; Handbook of Metathesis, Vol. 1-3, R. H. Grubbs, Wiley-VCH 2003). This reaction is catalysed by a number of transition metals or compounds thereof, often with use of a cocatalyst which, together with the transition metal or the added transition metal compound, forms the catalytically active transition metal species in a reaction. Suitable cocatalysts are particularly aluminium organyls and tin organyls.

Other catalyst systems are based on defined transition metal complexes. The most well-known compounds include complexes based on ruthenium (Weskamp, T. Kohl, F. J. Herrmann, W. A. J. Organomet. Chem. 1999, 582, 362-365; Weskamp, T. Kohl, F. J. Hieringer, W., Gleich, D. Hermann, W. A. Angew. Chem. Int. Ed. 1999, 38, 2416-2419; Nguyen, S. T., Johnson, L. W., Grubbs, R. H., Ziller, J. W., J. Am. Chem. Soc. 1992, 114, 3974-3975; Bielawski, C. W., Grubbs, R. H., Angew. Chem. Int. Ed. 2000, 39, 2903-2906). However, a disadvantage here is their high cost, and particularly the difficulty of separation thereof from the reaction product. Residues of ruthenium lead to an often unacceptable colour of the product. In these cases, the polymer has to be purified by complex methods, for example reprecipitation, which is a barrier to economic preparation.

The properties of the resulting polymer can be adjusted via parameters such as temperature, concentration of monomer, catalyst concentration and reaction time. The molecular weight can be controlled via the addition of chain transfer agents, the task of which is to terminate the growing chain. Since the process is a statistical process, the molecular weight, in a first approximation, is in a reciprocal relationship to the concentration of chain transfer agent. Broadening of the molecular weight distribution as a consequence of secondary metathesis (chain transfer or "back-biting") is not being considered here. Thus, it is possible through addition of chain transfer agents to affect the weight-average molecular weight, but not the breadth of the molecular weight distribution. Later on in the reaction, there is secondary metathesis, in which what adds onto the active end of a growing chain is not a further monomer molecule but an existing polymer chain. The result is chain transfer, which results in an increase in the polydispersity (expressed as $(M_w/M_n)-1$ or $M_w/M_n$). A further observation with advancing reaction is the shift in the cis/trans ratio in favour of the trans configuration. This is an effect which can likewise be attributed to the secondary metathesis. In order to establish particular properties in the polymer, what is thus required is exact control of a wide variety of different process parameters.

The polymerization of cycloalkenes by ROMP constitutes an important process for preparing polyalkenamers. One example of this is the polymerization of cyclooctene to give polyoctenamer (for example VESTENAMER® from Evonik Industries, DE). In general, the polyalkenamer is used in solid form; for some applications, however, it is necessary for the polymer to be in a liquid state at room temperature. An important application for polyalkenamers is use in packaging, for example in packaging films, in order to improve the barrier properties of the film, especially with respect to oxygen, but also other substances, for example $CO_2$ or water. More particularly, the barrier properties are improved by the chemical binding of oxygen by the polyalkenamers (active barrier effect). In this case, generally a transition metal compound which accelerates the reaction of the polyalkenamer with oxygen is added to the polyalkenamer (EP2017308A1).

The polymerization of the cycloalkenes leaves monomers and oligomers of the monomer in the product mixture obtained. Studies have shown that these compounds in particular have elevated odour activity. Several authors report that the odour activity is correlated to the molar mass among other properties. Odorous substances of this kind (odour-active organic compounds, OVOCs), according to the source, have molar masses of not more than 350 g/mol or less than 300 g/mol, in order to be sufficiently volatile and perceptible as an odour (M. Schlegelmilch, Geruchsmanagement: Methoden zur Bewertung und Verminderung von Geruchsemissionen [Odour Management: Methods of Assessing and Reducing Odour Emissions], Hamburger Berichte 32 from the Hamburg-Harburg University of Technology, Abfall aktuell Publishers 2009, ISBN 978-3-9810064-9-0; M. Schön, R. Hübner, Geruch—Messung und Beseitigung [Odour—Measurement and Elimination], Vogel Publishers Würzburg, 1st edition 1996, ISBN 3-8023-1561-8; Umweltbundesamt, Innenraumlufthygiene-Kommission des Umweltbundesamtes, Leitfaden für die Innenraumhygiene in Schulgebäuden [German Environment Agency, Indoor Air Hygiene Commission of the German Environment Agency, Guidelines for Indoor Air Hygiene in School Buildings], page 47, 2008; G. Scharfenberger, Papier+Kunststoff-Verarbeiter 10, 1990).

The problem addressed was thus that of providing a process for producing polyalkenamer-containing compositions which results in products having reduced odour activity. Compared to the methods of the prior art, polymers having a suitable reduced monomer and oligomer content were to be obtained. In this context, more particularly, compositions having relatively high purity were to be obtained. For this purpose, it was to be possible not only to remove monomers and oligomers down to a molar mass of 450 g/mol, but also to reduce the level of oligomers up to 1000 g/mol. The process was to be operable in an automatable manner. Furthermore, the polyalkenamer-containing compositions were to be exposed to relatively low thermal stress.

The polyalkenamer compounds were to have at least an equal active barrier effect (for example equal effect in the chemical binding of oxygen). This was to assure use in the food and drink sector.

The problem was solved by incorporating a diafiltration into the process.

The object was accordingly achieved by a process for producing a polyalkenamer-containing composition, comprising the steps of:
 a) converting at least one cycloalkene by ring-opening metathetic polymerization to obtain a polyalkenamer-containing product mixture, and
 b) working up the product mixture to remove the monomers and oligomers of the cycloalkenes to obtain the polyalkenamer-containing composition,
wherein the removal in step b) is effected by a diafiltration (membrane filtration with dilution or washing).

The process according to the invention makes it possible to remove both monomers and oligomers of the cycloalkenes, the molar mass of which is above 450 g/mol. Compared to the precipitation methods of the prior art, diafiltration further offers the advantage that less solvent overall is used, the solvent is much easier to recycle and is reusable as a result. In addition, there is low thermal stress for the polymeric composition.

The diafiltration shall especially be effected with a visually clear solution. Should any precipitate or turbidity be apparent prior to performance of the diafiltration, this can be removed by decanting it off or by standard filtration methods, for example paper, glass, metal, plastic, ceramic or porcelain filters.

Diafiltration is used in the context of the invention as a collective term for membrane filtrations in which the filtrant, for example as feed stream, circulation stream or retentate stream, is diluted with solvent, such that it is possible to wash out the low molecular weight substances (M. Mulder, Basic Principles of Membrane Technology, 2nd ed., 1996, page 491; A. Basile, S. P. Nunes, Membranes for industrial microfiltration and ultrafiltration, Woodhead Publishing Ltd., 2011, page 661). A suitable membrane for the purpose of depleting all the low molecular weight monomeric and oligomeric constituents up to 1000 g/mol should have a maximum proportion of these compounds in the permeate. At the same time, the suitable membrane should show a very low proportion for the main fraction of the polyalkenamers having molar masses exceeding 25 000 g/mol, in order to avoid significant product losses of these products (main fraction).

FIG. 1 shows, by way of example, a membrane system in the form of a crossflow filtration. The solution to be processed is initially charged in a feed vessel 1, introduced into the circuit having been compressed by means of a high-pressure pump 2, and passed through the membrane by means of a circulation pump 3. The pressure is adjusted via a supply pressure regulator 7. The membrane module (membrane cell) 4 effects the separation into retentate 5 and permeate 6. Retentate and permeate can be recycled into the feed vessel or removed via various connections which are controlled, for example, by means of the ballcocks 8a and 8b.

Typical molecular separation limits of the ultrafiltration membrane at which 90% of the molecules of a particular molar mass are retained are between 1000 and 100 000 g/mol (T. Melin, R. Rautenbach, Membranverfahren: Grundlagen der Modul-und Anlagenauslegung [Membrane Processes: Principles of Module and System Design], 3rd ed., Springer 2007, p. 313). The separation limit of the nanofiltration membranes is between 100 and 2000 g/mol (T. Melin, R. Rautenbach, Membranverfahren: Grundlagen der Modul-und Anlagenauslegung, 3rd ed., Springer 2007, p. 286, diagram). Accordingly, a suitable membrane may be a nano- or ultrafiltration membrane. A suitable membrane having the desired separation capacity is stable in the solvent or solvent mixture used.

The membrane element preferably has a membrane which is produced with a separating layer of polymer, glass, metal, ceramic, or mixtures thereof.

Suitable inorganic membranes are selected from porous metallic materials, ceramic membranes and polymer ceramic membranes, each of which may be selected from aluminium oxide, titanium dioxide, zirconium dioxide, silicon dioxide, titanium nitrite, silicon carbide or mixtures and polymorphs thereof. Ceramic membranes of this kind are supplied, for example, by Inopor GmbH, PALL Corporation or TAMI Industries. An overview of the suppliers is given in R. Mallada, M, Inorganic Membranes: Synthesis, Characterization and Applications, Elsevier, 2008, p. 182, Table 6.1. Because of the relatively high ratio of active membrane area to system volume, membranes in the form of spiral-wound modules of the polymer membranes are particularly preferred.

Preference is given to solvent-stable polymer membranes, as described, for example, in US 2012/0123079, WO 2010/142979, US 2012/0279922 or EP 0943645B1.

Suitable membrane separation layers are described, for example, in WO 2010/142979, US 2012/0279922 or EP 094364561. Suitable polymers are especially suitable for organic solvents. The membrane separation layers are preferably selected from polydimethysiloxanes (PDMS) or modifications thereof (especially acrylate modifications), polyacrylonitriles (PAN), polyimides (PI), polyetheretherketones (PEEK), polyvinylidene fluorides (PVDF), polyamides (PA), polyamidimides (PAD), polyethersulfones (PES), polybenzimidazoles (PBI), sulphonated polyetheretherketones (SPEEK), polyethylenes (PE) and polypropylenes (PP). Less preferred are membranes optimized for aqueous systems. These usually include polymers such as cellulose acetate (CA), polyethersulphones (PES) and polysulphones (PS).

The adjustment of the parameters such as selection of the material of the membrane separation layer, temperature, pressure and membrane surface area can be undertaken by the person skilled in the art by suitable preliminary experiments. No forecast models for the performance of the membranes used exist as yet.

By diafiltration, it is possible to remove monomers and oligomers from the product mixture (membrane filtration with dilution, washing). The retentate contains the polyalkenamer-containing composition and has been depleted of oligomers, whereas the permeate contains predominantly the monomers and oligomers.

In a preferred embodiment of the invention, the wash solvent is recycled. For this purpose, the permeate from the washing comprising monomers and oligomers is subjected to a further process step. For this purpose, the permeate can be distilled or subjected to a further membrane filtration. The membrane element in this further membrane filtration is selected such that the monomers and oligomers can be separated from solvent. The solvent can then be recycled and supplied to the reaction (step a) or the workup (step b).

Oligomers in the context of this invention are oligomers of the cycloalkene used, having a molar mass of not more than 1000 g/mol. The measurement is based on DIN 55672-1 (see below).

It is preferable that the sum total of monomers and oligomers (impurities) in the polyalkenamer-containing composition is less than 20 000 ppm, based on the total weight of the composition. More preferably less than 10 000 ppm, even more preferably less than 2500 ppm and especially less than 1000 ppm of impurities are present. Results of this kind can be established by the person skilled in the art by varying the duration of the diafiltration (especially the exchange factor of the solvent on the retentate site) and the selection of the membrane with a suitable separation layer.

The diafiltration is preferably conducted in the form of a crossflow filtration which no polymer layer settles out on the membrane. This is assured by a sufficiently high crossflow rate over the membrane. Preference is given here to "feed-and-bleed" connection of the pumps and membrane. For this purpose, the polymer feed solution is conveyed by means of a high-pressure pump into a membrane circuit in which there is a circulation pump (cf. T. Melin, R, Rautenbach, *Membrane Processes: Fundamentals of Module and System Design*, 3rd ed., Springer 2007, p. 207), The permeate stream is removed through the membrane and retentate stream (also called concentrate stream) is removed from the circuit, Addition of wash solvent. (solvent with which the diafiltration is conducted) can take place, for example, in the circulation stream, retentate stream or feed stream, or in the feed vessel.

The mono- and oligomers and by-products such as alkane derivatives are determined as follows:

Retentate

Sample preparation: About 1 mg of sample in each case are weighed into an empty TDS tube.

Making up the external standard solution: 50 mg of hexadecane are weighed accurately into a 100 ml standard flask, made up to the mark with methanol and homogenized by shaking. 2 µl of this solution (corresponding to about 1 µg) are applied to a Tenax tube. This external standard is analysed once at the start and once at the end of the sequence.

The determination was effected by means of an Agilent 6890 gas chromatograph with ChemStation software; parameters: Rtx-5 separation column; length: 60 m; internal diameter: 250 µm; film thickness: 0.25 µm; carrier gas: helium; column supply pressure: 186 kPa; oven temperature: 50° C.-10° C./min-320° C. (23 min); split: 30:1; detector temperature: 280° C. (Thermal Aux). The thermal desorption unit has been set up as follows: Gerstel TDSA; TDS oven (initial temperature: 20° C.; equilibration time: 1 min; initial time: 0.01 min; heating rate: 60° C./min; end temperature: 280° C.; hold time: 20 min); cold application system (initial temperature: −150° C. (with liquid $N_2$ cooling); equilibration time: 0.05 min; initial time: 0.01 min; heating rate: 12° C./s; end temperature: 300° C.; hold time: 5 min). The following additional settings were used: transfer temperature: 330° C.; desorption mode: splitless; sample mode: Remove Tube; mass-selective detector: scan module 25-500 m/z, solvent delay 0 min.

Permeate

Making up the external standard solution: 100 mg of hexadecane are weighed accurately into a 100 ml standard flask, made up to the mark with n-hexane and homogenized by shaking. 3 µl of this solution are injected with a sampler into the split/splitless injector of the GC-MS. The standard has a concentration of 1000 mg/l and is analysed once at the start and once at the end of the sequence. The blank used is n-hexane.

The determination was effected without sample preparation by means of an Agilent 7890 gas chromatograph with ChemStation software; parameters: Rtx-5 separation column; length: 60 m; internal diameter: 250 µm; film thickness: 0.25 µm; carrier gas: helium; column supply pressure: 203 kPa; oven temperature: 50° C.-10° C./min-320° C. (23 min); split: 30:1; detector temperature: 300° C. (Thermal Aux); Agilent 5975 mass-selective detector, scan module 25-500 m/z, solvent delay 0 min.

The conversion of the cycloalkene(s) can be conducted without solvent. Alternatively, the reaction can be conducted in at least one solvent. Suitable solvents are, for example, saturated aliphatic hydrocarbons such as hexane, heptane, octane, nonane, decane, dodecane, cyclohexane, cycloheptane or cyclooctane; aromatic hydrocarbons such as benzene, toluene, xylene or mesitylene; halogenated hydrocarbons such as chloromethane, dichloromethane, chloroform or carbon tetrachloride; ethers such as diethyl ether, tetrahydrofuran or 1,4-dioxane; ketones such as acetone or methyl ethyl ketone; esters such as ethyl acetate; and mixtures of the aforementioned solvents. More preferably, the solvent for the reaction is selected from the group consisting of aliphatic and aromatic hydrocarbons, here especially preferably alkanes having five to twelve carbon atoms, even more preferably five to eight carbon atoms, and toluene.

Preference is further given to selecting tetrahydrofuran, methyl ethyl ketone, chloromethane, dichloromethane, chloroform or mixtures thereof. Hexane or toluene are very particularly preferred, and especially hexane is selected. The content of solvents may be set, for example, to a value of 20% to 60% by weight, preferably of 40% to 60% by weight, based on the total weight of cycloalkene and solvent.

In the choice of solvents for the ring-opening metathesis reaction, it should be noted that the solvent should not deactivate the catalyst or the catalytically active species. This can be recognized by the person skilled in the art by simple experiments or by studying the literature. In the case of catalyst systems containing aluminium organyls, aromatic or aliphatic hydrocarbons bearing no heteroatoms are especially suitable.

In a further embodiment of the invention, the polyalkenamer-containing composition may contain a stabilizer. This can increase the storage stability and/or processing stability thereof. Suitable stabilizers may be selected from the group of the sterically hindered phenols, for example 2,5-di-tert-butylhydroquinone, 2,6-di-tert-butyl-p-cresol, 4,4'-thiobis(6-tert-butylphenol), 2,2'-methylenebis(4-methyl-6-tertbutylphenol), octadecyl 3-(3',5'-di-tert-butyl-4'-hydroxyphenyl)propionate, 4,4'-thiobis(6-tert-butylphenol), 2-tert-butyl-6-(3-tert-butyl-2-hydroxy-5-methylbenzyl)-4-methylphenyl acrylate, 2,6-di(tert-butyl)-4-methylphenol (BHT), 2,2-methylenebis(6-tert-butyl-p-cresol), from the group of the organic phosphites, for example triphenyl phosphite, tris(nonylphenyl) phosphite, the group of the organic thio compounds, for example dilauryl thiodipropionate, pentaerythritol tetrakis(3-laurylthiopropionate), polyphenolic compounds like hydroquinone (benzene-1,4-diol) or resorcinol (benzene-1,3-diol), sterically hindered aromatic diamines like 4,4'-Bis(alpha, alpha-dimethylbenzyl) diphenylamine, hindered amine light stabilizers like 1,5,8,12-Tetrakis[4,6-bis(N-butyl-N-1,2,2,6,6-pentamethyl-4-piperidylamino)-1,3,5-triazin-2-yl]-1,5,8,12-tetraazadodecane or Poly[[6-[(1,1,3,3-tetramethylbutypamino]-1,3,5-triazine-2,4-diyl][(2,2,6,6-tetramethyl-4-piperidinyl)imino]-1,6-hexanediyl[(2,2,6,6-tetramethyl-4-piperidinyl)imino]]) or from the group of benzofurane compounds like 5,7-di-tert-butyl-3-(3,4-dimethylphenyl)3H-benzofuran-2-one and 5,7-di-tert-butyl-3-(2,3-dimethylphenyl)3H-benzofuran-2-one, ascorbic acid, vitamin E and mixtures thereof.

The stabilizer may be present within a range from 5 to 7500 ppm, preferably 25 to 750 ppm, based in each case on the weight of the polyoctenamer. It is possible to add the stabilizer according to one of the following steps:

The stabilizer can be added before, during and after the metathesis polymerization. The stabilizer can be incorporated into the melt of the polymer, for example via compounding in an extruder. The stabilizer can either be metered in directly or added via a masterbatch. This can also occur only in the course of further processing to give a blend with a further polymer and/or the production of shaped bodies, for example films. Another option is to dissolve the stabilizer in a suitable solvent and to apply it to the particles of the polyalkenamer. Subsequently, the solvent is removed, for example by a drying step, in which elevated temperature and/or reduced pressure are used. The stabilizer then remains on the surface of the particles and/or is absorbed into the particles during the drying. Another option is to apply the stabilizer to the particles as a powder coating. In addition, it is possible to add the stabilizer to a solution of the polyalkenamer-containing composition.

It is also possible to produce a mixture in which polyalkenamer particles including a stabilizer in a relatively high concentration are present alongside polyalkenamer particles containing no stabilizer or a lower concentration of stabilizer.

In addition, the polyalkenamer composition may contain dyes (soluble colourants).

Suitable solvents for the washing (wash solvents) may be selected from the solvents mentioned for the conversion of the cycloalkenes, preference being given to alkanes having five to twelve carbon atoms, particular preference to those having five to eight carbon atoms, and very particular preference to hexane. If a solvent is used for said conversion of the cycloalkenes, the same solvent or another solvent can be used for the workup of the product mixture. Should the product mixture still be present in a solvent after the conversion (step a), it is preferable for economic reasons to leave it in this solvent and to conduct the diafiltration in this solvent. In this case, the polyalkenamer remains in solution during the purification, which makes it easier to process and means that no losses arise as a result of recrystallization or filtration or other processes for product isolation, for example drawing off the solvent or vacuum drying. Thus, significantly fewer manual operations are necessary.

Prior to performance of the diafiltration, the solution of the polyalkenamer-containing product mixture can be diluted, preference being given to adding the same solvent or the same solvent mixture. In this way, it is possible to establish a concentration or viscosity of the polymer solution which is suitable for the diafiltration. Alternatively, the temperature of the solution can be increased in order to reduce the viscosity. In this case, temperatures below the boiling points of the solvents used are chosen. Compared to dilution, increasing the temperature has the advantage that the diafiltration can be conducted with higher concentrations. Thus, a higher yield per unit time is obtained. The two methods can be combined with one another.

The solvent (mixture) used for the diafiltration can be admixed with a stabilizer in order to obtain a constant stabilizer concentration on the retentate side during the diafiltration. This may be necessary if the stabilizer is being depleted by the diafiltration. This addition does not depend on whether the solution of the polyalkenamer-containing composition already contains a stabilizer and the concentration in which it is present therein. Suitable stabilizers are mentioned above, whereby used stabilizers are mentioned above, whereby used stabilizers may be the same or different than the ones already present in the polymer. The stabilizer may be present in the solvent (mixture) within a range from 5 to 7500 ppm, preferably 25 to 2500 ppm, more preferably 100 to 1200 ppm, based in each case on the weight of the solvent (mixture).

The content of solvents should be adjusted to the diafiltration, in which case the person skilled in the art is able to determine the content for an optimal separation by simple preliminary experiments. One example of the influencing parameters and the optimization of a diafiltration process is presented in Application Note—Millipore—A Hands-On Guide to Ultrafiltration/Diafiltration Optimization using Pellicon® Cassettes.

In an alternative embodiment, the product mixture from step a, for example for transport, can be converted to the solid form. For this purpose, the solvent can be removed by the processes known to those skilled in the art that are specified below. Thereafter, the product mixture can be pelletized or pulverized to give particles. Preferably, the mean mass of the particles is less than 100 g/1000, more preferably less than 10 g/1000 and especially preferably less than 1 g/1000. This includes mean masses up to a maximum size of 1000 g/1000. For subsequent performance of the diafiltration, the material is brought back into solution.

To determine the mean mass, about 2-3 g of the particles are applied to a clean underlayer, for example a sheet of paper. Subsequently, all grains in this sample are counted and transferred to a petri dish; spikes of length>1.0 cm or chains of pellets>1.0 cm are excluded (discarded) and are not assessed here. The number of pellet grains is noted; it has to be min. 150. Subsequently, the pellet grains are weighed accurately to 0.1 g and expressed on the basis of 1000 pellets. If there are less than 150 pellet grains, a new, correspondingly larger particle volume has to be taken as sample.

In a preferred embodiment of the process according to the invention, the cycloalkene is selected from the group consisting of cyclobutene, cyclopentene, cycloheptene, cyclooctene, cyclononene, cyclodecene, cyclododecene, cycloocta-1,5-diene, 1,5-dimethylcycloocta-1,5-diene, cyclodecadiene, norbornadiene, cyclododeca-1,5,9-triene, trimethylcyclododeca-1,5,9-triene, norbornene (bicyclo[2.2.1]hept-2-ene), 5-(3'-cyclohexenyl)-2-norbornene, 5-ethyl-2-norbornene, 5-vinyl-2-norbornene, 5-ethylidene-2-norbornene, dicyclopentadiene and mixtures thereof. Particular preference is given to cyclopentene, cycloheptene, cyclooctene and cyclododecene. Cyclooctene is an excellent cycloalkene because of its availability and ease of handling. It is possible to use two or more cycloalkenes, so as to form copolymers of the polyalkenamer. The cycloalkenes may be substituted by alkyl groups, aryl groups, alkoxy groups, carbonyl groups, alkoxycarbonyl groups and/or halogen atoms.

The membrane separation may be followed by a further addition of stabilizer in order to compensate, for example, for any losses from the diafiltration or to establish a desired final concentration.

After the membrane separation, the solvent in which the polyalkenamer-containing composition has been dissolved can be removed. This can be undertaken by heating or reducing the pressure, for example by means of vacuum degassing. Alternatively or additionally, a drying operation can be conducted, for example under reduced pressure and/or at elevated temperature, in order to remove the solvent. The solid obtained can be pelletized to particles, for example by strand granulation or underwater granulation, or pulverized, for example by spray-drying or grinding.

The process according to the invention can be conducted continuously or batchwise.

The polyoctenamer preferably has a weight-average molecular weight (Mw) of 1500 g/mol to 500 000 g/mol, preferably of 2000 g/mol to 50 000 g/mol, more preferably of 5000 to 250 000 g/mol, even more preferably of 10 000 to 200 000 and especially of 20 000 to 200 000. The molecular weight is determined by means of GPC against a styrene standard. The measurement is based on DIN 55672-1.

Sample preparation: The samples are dissolved with a content of 5 g/l in tetrahydrofuran at room temperature. They are filtered prior to injection into the GPC system (0.45 µm syringe filter). The measurement is effected at room temperature.

Column Combination
1×5 cm, 5 µm, 100 Å, (styrene-divinylbenzene copolymer)
1×30 cm, 5 µm, 50 Å, (styrene-divinylbenzene copolymer)
1×30 cm, 5 µm, 1000 Å, (styrene-divinylbenzene copolymer)
1×30 cm, 5 µm, 100 000 Å, (styrene-divinylbenzene copolymer)
Mobile phase: ultrapure tetrahydrofuran, stabilized
Flow rate: 1 ml/min
Detection: refractive index detector
Calibration: polystyrene The desired molar mass can be established, for example, in the presence of at least one chain transfer agent, which allows the chain buildup to be stopped. Suitable chain transfer agents are, for example, acyclic alkenes having one or more non-conjugated double bonds which may be in terminal or internal positions and which preferably do not bear any substituents. Such compounds are, for example, pent-1-ene, hex-1-ene, hept-1-ene, oct-1-ene or pent-2-ene. In addition, it is possible to use cyclic compounds having a double bond in the side chain thereof, for example vinylcyclohexene.

The cis/trans ratio of the cycloalkenamers can be adjusted by methods familiar to the person skilled in the art. For example, the ratio is dependent on catalysts, solvents, stirring intensity or temperature or reaction time. Preferably, the trans content is at least 55%. The cis/trans ratio is determined by means of $^1$H NMR in deuterochloroform.

The conversion of the cycloalkene can be effected in the presence of at least one catalyst. Suitable catalysts are, for example, transition metal halides which, together with an organometallic compound as cocatalyst, form the species which is catalytically active for the polymerization. The metal in the organometallic compound differs here from the transition metal in the halide. Alternatively, it is possible to use transition metal-carbene complexes. Useful transition metals include metals of groups 4 to 8, for example molybdenum, tungsten, vanadium, titanium or ruthenium. Metals in the organometallic compound are, for example, aluminium, lithium, tin, sodium, magnesium or zinc. Suitable catalysts and the amounts thereof to be used are detailed, for example, in EP-A-2017308.

Preference is given to using a catalyst system containing at least one alkylaluminium chloride, tungsten hexachloride or mixtures. Suitable alkylaluminium chlorides are ethylaluminium dichloride (Et-AlCl$_2$) and ethylaluminium sesquichloride, which may also be used in mixtures. A preferred catalyst system contains tungsten hexachloride and ethylaluminium dichloride or, in a particularly preferred embodiment, consists of these two compounds. The mass ratio of the aluminium chlorides to tungsten hexachloride is preferably one to six. Particular preference is given to a ratio of two to five. To activate the catalyst, acidic compounds such as alcohols can be used.

The tungsten hexachloride can be used within a range from 0.1 to 0.04 mol %, more preferably from 0.1 to 0.01 mol %, based on the cycloalkene used. The alkylaluminium chlorides are preferably within a range from 0.2 to 0.08 mol %, more preferably 0.2 to 0.02 mol %, based on cycloalkene.

The conversion of the cycloalkenes can be conducted either isothermally or adiabatically. The temperature is preferably within a range between −20 and 120° C. This is dependent particularly on the monomers used and any solvent present. A particularly preferred temperature is in the range from 10 to 60° C. The reaction preferably takes place in a protective gas atmosphere. In the case of an adiabatic process regime, the temperature can be determined via parameters such as amount of catalyst, rate of catalyst addition, time of termination of the reaction, etc. The preferred temperature range here is 20 to 50° C.

On attainment of the desired reaction time, the polymerization can be ended by inactivation of the catalyst system. For this purpose, for example, it is possible to add a suitable amount of CH-acidic compound. Suitable examples for this purpose are alcohols such as methanol, ethanol, propanol, etc., or else carboxylic acids such as acetic acid.

The invention likewise provides for the use of at least one polyalkenamer-containing composition according to the invention or of at least one composition obtained by the process according to the invention in packaging materials, wherein the packaging materials are preferably used for food and drink.

EXAMPLES

A. Separation Characteristics of Various Membranes

Experiment A was intended to determine whether the membranes used transfer the monomers and oligomers to the permeate and the polymer remains in the retentate.

I. Production of a Solution of a Polyalkenamer-Containing Product Mixture

The polyalkenamer-containing product mixture used was Vestenamer® 8020 (polyoctenamer) from Evonik, Germany. The pellets of this product that were used contain a minor amount of cyclooctene.

Preparation of a Solution (10% by Weight) of a Polyoctenamer-Containing Product Mixture from Pellets (Feed Mixture):

| | |
|---|---|
| Irganox 1076 | 1.68 g |
| Vestenamer 8020 | 132 g |
| Hexane (techn.) | 1187 g |

The polymerization inhibitor (Irganox 1076) was added in order to ensure that no polymerization takes place during the filtration. The solution was produced under reflux by gradual metered addition of the polyoctenamer pellets to hexane continuously stirred at 50° C.

II. Performance of the Membrane Filtration

The membrane filtrations were conducted in the form of a crossflow filtration. The membrane system had a flat rectangular membrane cell of length 20 cm, width 4 cm and channel height 0.1 cm. A nanofiltration membrane (ONF-2 from GMT Membrantechnik) and an ultrafiltration membrane (L-6 from GMT Membrantechnik) were used. The permeate flow rate was determined by weighing the permeate that accrues within a particular period. The weighed permeate was returned to the feed solution.

Parameters of Membrane Filtration 1 (ONF-2 Nanofiltration Membrane):
Transmembrane pressure: 30 bar
Flow rate in the circuit: >150 l/h
Temperature in the circuit: 49±0.5° C.
Permeate flow rate: 21.43 kg/(m²·h)

Parameters of Membrane Filtration 2 (L-6 Ultrafiltration Membrane):
Transmembrane pressure: 5 bar
Flow rate in the circuit: >150 l/h
Temperature in the Circuit:

Parameters of Membrane Filtration 3 (L-6 Ultrafiltration Membrane):
Transmembrane pressure: 10 bar
Flow rate in the circuit: >150 l/h
Temperature in the circuit: 49±0.5° C.
Permeate flow rate: 19.88 kg/(m²·h)

a) Conditioning of the Membrane

The conditioning was intended to remove extraneous substances in the membrane and the system. For this purpose, 0.5 l of hexane was circulated at low pressure for one hour and discharged before the experiment.

b) Membrane Filtration of the Product Mixture

At the start, about 1 l of the feed mixture were introduced into the jacketed reservoir vessel (feed vessel) with a stirrer. Subsequently, this mixture was pumped by means of a high-pressure pump in the recirculation circuit (about 40 l/h). In this circuit were installed a centrifugal pump and a trace heating system. The ballcock 8a was open and the ballcock 8b was closed. A portion of the feed stream that passed through the membrane (permeate stream) was routed back to the feed vessel; only for sampling was the permeate stream briefly diverted (ballcock 8b open) and collected as permeate sample. The portion that did not get through the membrane was routed back into the feed vessel as retentate stream.

On attainment of constant permeate flow, permeate and retentate samples were taken. The retentate sample was taken directly beyond the supply pressure regulator and had the same concentration as the solution in the circuit on the pressure side of the membrane. The permeate sample was taken close to the membrane cell. Both samples (retentate and permeate) were taken at virtually the same time.

III. Result

For identification of the low molecular weight components in the samples, GC-MS analyses were conducted by a direct injection with a liquid sampler. By evaluation against an external calibration standard (1000 mg of hexadecane/ml), the substances detected were determined semi-quantitatively as "hexadecane equivalent". The test method serves merely to estimate the amount of volatile substances.

TABLE 1

Membrane filtration 1 - Comparison of the proportions of oligomers (in mg/kg of hexane) in the retentate and permeate from the vapour phase (ONF-2 membrane)

| | Retentate | Permeate | Permeate/retentate |
|---|---|---|---|
| Cyclooctene | | 3 | |
| Cyclooctane | 26 | 24 | 0.92 |
| Cyclooctene, dimer | 302 | 284 | 0.94 |
| Cyclooctene, trimer | 721 | 432 | 0.59 |
| Cyclooctene, tetramer | | 170 | |

TABLE 2

Membrane filtration 2 - Comparison of the proportions of oligomers (in mg/kg of hexane) in the retentate and permeate from the vapour phase (L-6 membrane, 5 bar)

| | Retentate | Permeate | Permeate/retentate |
|---|---|---|---|
| Cyclooctene | | | |
| Cyclooctane | 20 | 27 | 1.35 |
| Cyclooctene, dimer | 179 | 338 | 1.89 |
| Cyclooctene, trimer | 352 | 703 | 2.00 |
| Cyclooctene, tetramer | | 588 | |

TABLE 3

Membrane filtration 3 - Comparison of the proportions of oligomers (in mg/kg of hexane) in the retentate and permeate from the vapour phase (L-6 membrane, 10 bar)

|  | Retentate | Permeate | Permeate/retentate |
|---|---|---|---|
| Cyclooctene |  |  |  |
| Cyclooctane | 23 | 26 | 1.13 |
| Cyclooctene, dimer | 294 | 338 | 1.15 |
| Cyclooctene, trimer | 616 | 721 | 1.17 |
| Cyclooctene, tetramer |  | 573 |  |

In the permeates from the three filtrations, oligomers and cyclooctane are detectable. In this respect, both membranes are suitable in principle for undertaking depletion of oligomers by diafiltration. Compared to the retentates, it is actually possible to detect higher proportions of oligomers and cyclooctane by means of membrane L-6. An increase in the pressure from 5 bar (Table 2) to 10 bar (Table 3) does lead to a slight improvement in the flow rate. However, undesirable effects occur: a lower level of oligomers—relative to the retentate—was detected in the permeate. In this respect, the optimal operating conditions for the respective membrane and mixture should be ascertained by the person skilled in the art in advance.

The permeates were analysed by GPC in order to detect the molar mass distribution of the monomers and oligomers that passed through the membrane (determination method: see description). A comparison with the molar mass distribution of the mono- and oligomers in the polyoctene-containing product mixture used gives information as to whether the main fraction of the polyalkenamer having a weight-average molar mass Mw of >25 000 remains in the retentate.

B. Diafiltration

In experiment B, the L-6 ultrafiltration membrane tested in A was used for a diafiltration (membrane filtration with dilution by addition of solvents).

I. Production of a Solution of a Polyalkenamer-Containing Product Mixture

The polyalkenamer-containing product mixture used was Vestenamer® 8020 (polyoctenamer) from Evonik, Germany.

Preparation of a Solution (10% by Weight) of a Polyoctenamer-Containing Product Mixture from Pellets (Feed Mixture):

| Irganox 1076 | 1.56 g |
|---|---|
| Vestenamer 8020 | 130 g |
| Hexane (techn.) | 1170 g |

The solution was produced under reflux by gradual metered addition of the polyoctenamer pellets to continuously stirred hexane. The solution produced was divided into two feed solutions.

II. Procedure for the Diafiltration

Parameters of the Diafiltration (L-6 Ultrafiltration Membrane):

Transmembrane pressure: 5 bar
Flow rate in the circuit: >150 l/h
Temperature in the circuit: 50±0.5° C.
Permeate flow rate: 21.59 kg/(m²·h)

The permeate flow rate was determined by the change in volume within a particular period in the reservoir vessel (calibrated volume scale). The amount of permeate withdrawn was compensated for by adding fresh hexane to the reservoir (about 200 ml). During the diafiltration, the ballcock 8a was closed and the ballcock 8b was open.

TABLE 4

Proportions of polymer in the original feed solution and the permeates

| Membrane | Mn in g/mol | Mw in g/mol | Mp in g/mol | Poly-dispersity | Fractions <1000 g/mol | Fractions <25000 g/mol | Fractions >25000 g/mol |
|---|---|---|---|---|---|---|---|
| Poly-octenamer | 9600 | 110900 | 81300 | 11.5 | 3.51% | 10.46% | 89.54% |
| ONF-2 permeate | 250 | 1800 | 270 | 7.1 | 95.09% | 99.20% | 0.80% |
| L-6 Permeate 1 (5 bar) | 430 | 2200 | 810 | 5.2 | 71.75% | 98.33% | 1.67% |
| L-6 Permeate 2 (10 bar) | 380 | 1200 | 810 | 3.2 | 78.87% | 99.55% | 0.45% |

Mn = number-average molecular weight
Mw = weight-average molecular weight
Mp = molecular weight, peak maximum The "fractions<25 000 g/mol" and "fractions>25 000 g/mol" together add up to 100% in each case.

The study shows that the proportion of polymers having a molar mass above 25 000 g/mol is below 2%. In this respect, the membrane filtration leads not just to transfer of the monomers and oligomers to the permeate but also to separation from the polyalkenamer-containing composition, since the composition remains in the retentate.

With constant addition of fresh solvent (hexane), the quotient of final concentration and starting concentration in the solution can be determined via equation 1.

$$\frac{C(\text{Feed, end})}{C(\text{Feed, start})} = \exp\left(-(1-R) \cdot \frac{V(\text{Wash})}{V(\text{Feed})}\right) \quad 1$$

In this equation, C(Feed,end) and C(Feed,start) mean the proportions of a component at the end and at the start of a measurement in the feed solution, R means the retention of the component, V(Feed) means the volume of the washed feed solution and V(Wash) means the volume of the solvent which has been introduced during the diafiltration. The experiment was stopped at a wash factor V(Wash)/V(Feed) =1.67.

III. Result

The proportions of the monomers and oligomers were determined at the start and the end of the diafiltration by GC-MS measurements (analogously to Example A).

TABLE 5

C(Feed, start) and C(Feed, end) of the diafiltration experiment - proportions of monomers and oligomers in the vapour phase in mg/kg of hexane

|  | C(Feed, start) | C(Feed, end) | $\frac{C(Feed, end)}{C(Feed, start)}$ |
|---|---|---|---|
| Cyclooctene |  |  |  |
| Cyclooctane | 5 | <1 | <20% |
| Cyclooctene, dimer | 480 | 90 | 18.8% |
| Cyclooctene, trimer | 590 | 90 | 15.3% |
| Cyclooctene, tetramer | 250 | 30 | 12% |

Significant depletion of the oligomers was observed.

Thereafter, the proportions of substances in the two feed solutions were determined by means of GPC at the start and at the end of the diafiltration (see above).

TABLE 6

Proportions of monomers, oligomers and polymer in the feed solutions at the start and at the end of the diafiltration

| Sample | Dry residue (% by wt.) | Mn in g/mol | Mw in g/mol | Mp in g/mol | Poly-dispersity | Fractions <1000 g/mol | Fractions <25000 g/mol | Fractions <25000 g/mol |
|---|---|---|---|---|---|---|---|---|
| Feed, start, sample 1 | 10.82 | 5000 | 141000 | 91000 | 27.6 | 4.75 | 9.88 | 90.12 |
| Feed, start, sample 2 | 10.50 | 5900 | 142000 | 91100 | 24.1 | 4.55 | 10.22 | 89.8 |
| Feed, end, sample 1 | 10.61 | 9000 | 147100 | 90600 | 16.3 | 1.90 | 5.83 | 94.17 |
| Feed, end, sample 2 | 10.22 | 8500 | 146100 | 90100 | 17.1 | 2.02 | 6.20 | 93.8 |

The proportions of monomers and oligomers below 1000 g/mol were distinctly reduced by the diafiltration. The polyoctenamer composition at the end of the diafiltration in each case contained about 94% of polymers having a molar mass of more than 25 000 g/mol.

The invention claimed is:

1. A process for producing a polyalkenamer-containing composition, the process comprising:
   a) converting at least one cycloalkene by ring-opening metathetic polymerization to obtain a polyalkenamer-containing product mixture, and
   b) working up the product mixture to remove at least one of a monomer and an oligomer of the at least one cycloalkene to obtain the polyalkenamer-containing composition, wherein
   said b) working up comprises a diafiltration.

2. The process according to claim 1, wherein a membrane for a membrane filter for the diafiltration comprises at least one separating layer selected from the group consisting of a polymer, glass, metal, and ceramic.

3. The process according to claim 1, wherein the cycloalkene is at least one member selected from the group consisting of cyclobutene, cyclopentene, cycloheptene, cyclooctene, cyclononene, cyclodecene, cyclododecene, cycloocta-1,5-diene, 1,5-dimethylcycloocta-1,5-diene, cyclodecadiene, norbornadiene, cyclododeca-1,5,9-triene, trimethylcyclododeca-1,5,9-triene, norbornene (bicyclo[2.2.1]hept-2-ene), 5-(3'-cyclohexenyl)-2-norbornene, 5-ethyl-2-norbornene, 5-vinyl-2-norbornene, 5-ethylidene-2-norbornene, and dicyclopentadiene.

4. The process according to claim 1, wherein the polyalkenamer-containing product mixture comprises a solvent and the diafiltration is conducted in said solvent.

5. The process according to claim 1, comprising converting the polyalkenamer-containing product mixture to a solid form and bringing said polyalkenamer-containing product mixture back into solution for subsequent conduction of the diafiltration.

6. The process according to claim 1, wherein said a) converting is carried out in the presence of a catalyst.

7. The process according to claim 1, wherein said a) converting is carried out in the presence of a chain transfer agent.

8. The process according to claim 1, wherein at least one solvent is present during diafiltration, wherein said at least one solvent comprises at least one stabilizer.

9. The process according to claim 1, wherein
   said a) converting is carried out in the presence of a catalyst that comprises at least one member selected from the group consisting of:
   a compound comprising at least one transition metal halide and an organometallic compound; and
   a compound comprising at least one transition metal-carbene complex.

10. The process according to claim 1, wherein
said a) converting is carried out in the presence of at least one chain transfer agent selected from the group consisting of:
an acyclic alkene comprising at least one non-conjugated double bond; and
a cyclic compound comprising a double bond in a side chain thereof.

* * * * *